United States Patent [19]

Alten

[11] Patent Number: 5,467,493
[45] Date of Patent: Nov. 21, 1995

[54] SUPPORT PLATES FOR BRIDGES AND RAMPS

[76] Inventor: Kurt Alten, Ringstr. 14, D-30974 Wennigesn, Germany

[21] Appl. No.: 110,288

[22] Filed: Aug. 19, 1993

[30] Foreign Application Priority Data

Aug. 19, 1992 [DE] Germany ............... 42 27 381.1

[51] Int. Cl.⁶ ................................................. B65G 69/28
[52] U.S. Cl. ..................... 14/69.5; 404/40; 14/73
[58] Field of Search ............. 14/2.4, 69.5, 71.1, 14/71.3, 73, 74.5, 77.3; 52/87; 731.2; 160/236; 404/34, 40, 43, 51; 182/45, 194, 228; 414/537

[56] References Cited

U.S. PATENT DOCUMENTS

| | | | |
|---|---|---|---|
| 884,847 | 4/1908 | Oslin | 14/69.5 |
| 2,343,833 | 3/1944 | Pinson | 14/69.5 X |
| 2,607,937 | 8/1952 | Stone | 14/69.5 |
| 3,253,288 | 5/1966 | Nagin | 14/73 |
| 4,119,224 | 10/1978 | Moody | 414/537 |
| 4,162,861 | 7/1979 | Reid et al. | 182/228 X |
| 4,290,728 | 9/1981 | Leduc | 414/537 |
| 5,145,310 | 9/1992 | Calzone | 14/71.3 X |
| 5,180,031 | 1/1993 | Smith | 182/45 X |

FOREIGN PATENT DOCUMENTS 786240  11/1957  United Kingdom ............... 14/73

OTHER PUBLICATIONS

Krafthand; 3 Oct. 1987.

Primary Examiner—Ramon S. Britts
Assistant Examiner—James A. Lisehora
Attorney, Agent, or Firm—Robert W. Becker & Associates

[57] ABSTRACT

A support plate for bridges and ramps having a roadway or a walkway has two longitudinal supports defining lateral sides of the support plate in the longitudinal direction of the support plate. A plurality of transverse members having acting surfaces constituting the roadway or walkway and having a first and a second free end is connected with the first and the second free ends to the longitudinal supports so as to be perpendicular to the longitudinal direction and parallel to one another. Each of the acting surfaces is slanted relative to the longitudinal direction and displaced by an increment of displacement with respect to neighboring ones of the acting surfaces in a stepwise manner over the height of the lateral sides.

13 Claims, 2 Drawing Sheets

SUPPORT PLATES FOR BRIDGES AND RAMPS

BACKGROUND OF THE INVENTION

The present invention relates to a support plate for roadways and/or walkways of bridges or ramps having two longitudinal supports defining the lateral sides of the support plate and a plurality of transverse members with parallel and planar roadway sections connecting the longitudinal supports, whereby the present invention is especially concerned with support plates which, when in use, have an ascending slant.

In known support plates of the aforementioned kind, the transverse members are designed such that the planar roadway sections define the roadway or walkway plane, i.e., the transverse members have aligned, flush roadway sections. These support plates have the disadvantage that they cannot be used at greater slants even when the roadway sections are provided with a non-skid surface or coating.

It is therefore an object of the present invention to provide support plates of the aforementioned kind that are suitable for use at greater slants and have at the same time sufficient non-skid characteristics.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
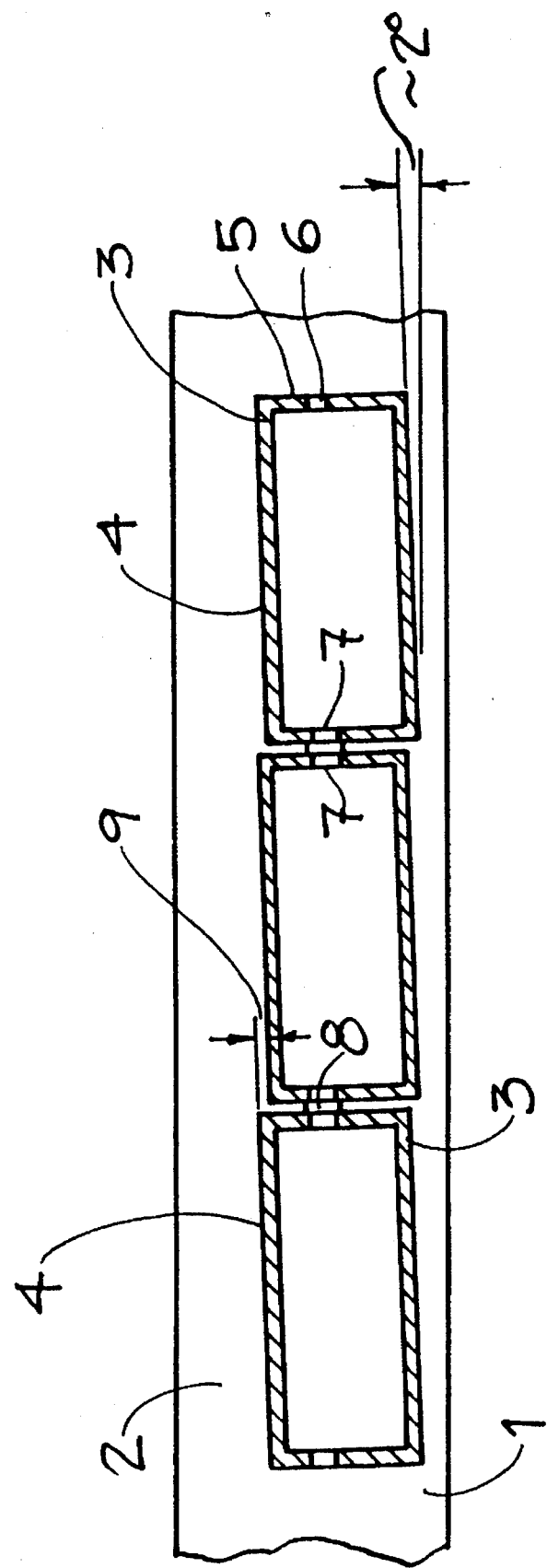
FIG. 1 is a longitudinal part section of a slanted ramp which may be displaceable.

The support plate for bridges and ramps having a roadway and/or a walkway according to the present invention is primarily characterized by:

Two longitudinal supports defining lateral sides of the support plate in the longitudinal direction of the support plate;

A plurality of transverse members having acting surfaces constituting the roadway and/or walkway and having a first and a second free end, the transverse members connected with the first and the second free ends to the longitudinal supports so as to be perpendicular to the longitudinal direction and parallel to one another; and Each of the acting surfaces being slanted relative to the longitudinal direction and displaced by an increment of displacement with respect to neighboring ones of the acting surfaces in a stepwise manner over a height of the lateral sides.

Preferably, the increment of displacement is 2 to 10 mm, more preferred 4 to 5 mm.

Expediently, neighboring ones of the transverse members are spaced at a distance from one another. Preferably, the transverse members are hollow profiles. Advantageously, the support plate further comprises connecting elements.

Advantageously, the connecting element comprises a plate with two sides and two projections, each projection connected to one side of the plate so as to be aligned with one another.

Each hollow profile has lateral walls extending perpendicular to the acting surface and transverse to the longitudinal direction. Facing ones of the lateral walls of adjacently positioned ones of the transverse members have recesses for engaging the connecting elements. The recesses of the facing lateral walls are spaced at different spacings from a corresponding one of the acting surfaces. Preferably, the recesses are bores.

Advantageously, the increment of displacement is equal to the difference between the different spacings.

In a preferred embodiment of the present invention, each hollow profile or transverse member has two lateral walls extending perpendicular to the acting surface and transverse to the longitudinal direction. The first one of the two lateral walls has recesses spaced at a first spacing from the acting surface and the second one of the two lateral walls has recesses spaced at a second spacing from the acting surface, wherein the first spacing is greater than the second spacing. The recesses are preferably bores, and the increment of displacement is equal to the difference between the first and second spacings.

Advantageously, the acting surfaces are slanted at an angle of 1° to 4°, preferably at an angle of substantially 2°.

Advantageously, when the support plate is used in a slanted position, the slant of the acting surfaces and the slant of the support plate in the longitudinal direction have the same orientation.

The transverse members, respectively, the hollow profiles with their roadway sections are deliberately not aligned or arranged flush in the longitudinal direction of the support plate, but are mounted at a small angle of slant whereby the subsequent hollow profile is displaced at an increment of displacement in a stepwise manner about the height of the longitudinal supports. From this results a substantially saw tooth profiling when the support plate is viewed in a direction transverse to the longitudinal or traffic direction. With the inventive measure the traction or non-skid properties of the support plate are substantially increased and vehicle wheels will find sufficient traction on the roadway. This is essentially also true for pedestrians.

DESCRIPTION OF PREFERRED EMBODIMENTS

Figure 2:
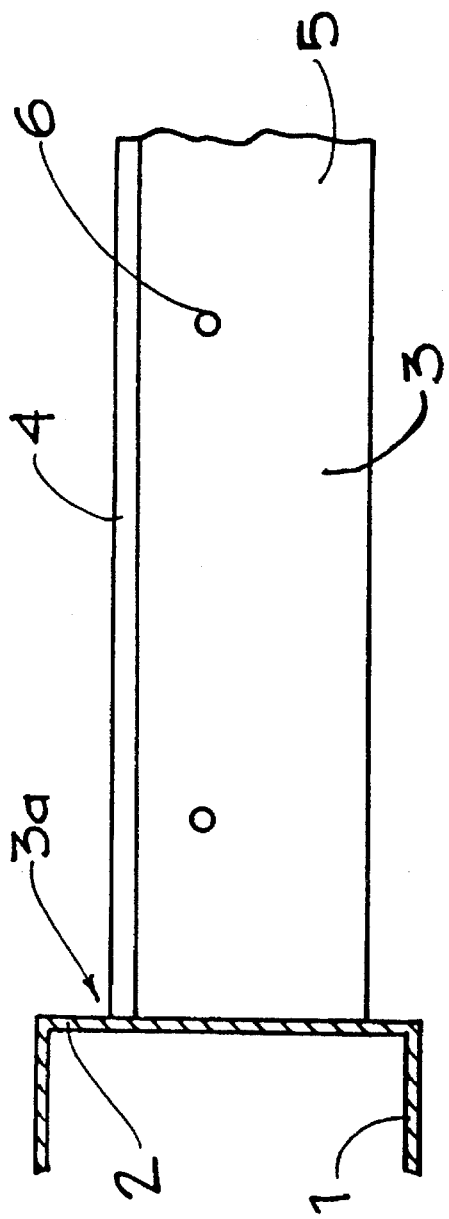
FIG. 2 is a part cross-sectional view of the ramp according to FIG. 1.
Figure 3:
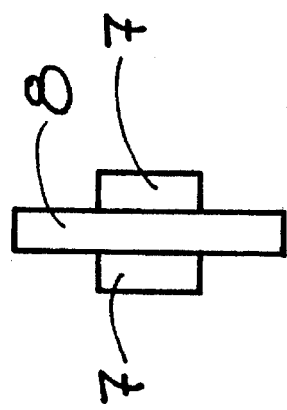
FIG. 3 is a connecting element for neighboring transverse members for the ramp according to FIGS. 1 and 2.

The present invention will now be described in detail with the aid of several specific embodiments utilizing FIGS. 1 through 3.

On both sides of the support plate or ramp longitudinal supports 1 are provided which are essentially U-shaped. The vertically extending stay of the support is designated by reference numeral 2. Between the stays 2 of the two longitudinal supports 1 transverse members 3 are connected with their free ends. They extend essentially perpendicular to the longitudinal direction of the support plate or ramp, i.e., the direction of traffic of the ramp. The transverse members 3 are in the form of closed hollow profiles with a rectangular cross-section. The upper surface 4 provides the acting surface for driving or walking on it and thus defines the roadway section which may be provided with a non-skid surface or coatings, especially when a steel construction is being used. The transverse members 3 extend over the entire width of the roadway, respectively, the walkway of the ramp. It should be noted that the width of the transverse members is approximately 140 mm and its height is approximately 80 mm.

The free ends of the transverse members 3 are welded to the longitudinal supports 1. The transverse members 3 are however connected to one another by a form-fitting connection in the form of an intermediate member or connecting element according to FIG. 3.

For this purpose, the lateral walls 5 of the transverse members 3 are provided with recesses or bores 6 such that the bores on one side of the transverse member 3 have a different spacing from the acting surface 4 than the bores on the opposite lateral wall. These bores 6 are engaged by projections 7 of the intermediate member according to FIG. 3 in an essentially play-free manner while the plate 8 between the two essentially aligned projections 7 defines the distance between the two transverse members. The connecting element 8 connects two neighboring transverse members 3 in a sufficiently displacement-resistant manner.

Due to the different positions of the bores 6 relative to the corresponding acting surface, neighboring transverse members 3 are displaced relative to one another. The increment of displacement 9 can be 2 to 10 mm, preferably it is between 4 to 5 mm. Accordingly, each roadway section, respectively, acting surface 4 is slanted at an angle of 2° relative to the longitudinal supports 1 which define the longitudinal and traffic direction of the ramp.

The defined distance between neighboring transverse members 3 has the advantage that through the resulting gap water can drain, respectively, soil and dirt can be removed.

The present invention is, of course, in no way restricted to the specific disclosure of the specification and drawings, but also encompasses any modifications within the scope of the appended claims.

What I claim is:

1. A support plate for bridges and ramps having a roadway and/or a walkway, said support plate comprising:
    two longitudinal supports defining lateral sides of said support plate in a longitudinal direction of said support plate;
    a plurality of transverse members having acting surfaces constituting the roadway and/or walkway and having a first and a second free ends, said transverse members connected with said first and said second free ends to said longitudinal supports so as to be perpendicular to said longitudinal direction and parallel to one another, wherein said transverse members are hollow profiles;
    each of said acting surfaces being slanted relative to said longitudinal direction and displaced by an increment of displacement with respect to neighboring ones of said acting surfaces such that said acting surfaces are stepped in said longitudinal direction; and
    connecting elements for connecting said transverse members to one another, said connecting elements each comprising a plate with two sides and two projections, each said projection connected to one said side of said plate so as to be positioned in a common plane.

2. A support plate according to claim 1, wherein said increment of displacement is 2 to 10 mm.

3. A support plate according to claim 2, wherein said increment of displacement is 4 to 5 mm.

4. A support plate according to claim 1, wherein neighboring ones of said transverse members 3 are spaced at a distance from one another.

5. A support plate according to claim 1, wherein:
    each said hollow profile has lateral walls extending perpendicular to said acting surface and transverse to said longitudinal direction;
    facing ones of said lateral walls of adjacently positioned ones of said transverse members having recesses for engaging said connecting elements; and
    said recesses of a first one of said facing lateral walls spaced at a first spacing from a corresponding one of said acting surfaces and said recesses of a second one of said facing lateral walls spaced at a second spacing from a corresponding one of said acting surfaces.

6. A support plate according to claim 5, wherein said recesses are bores 6.

7. A support plate according to claim 5, wherein said increment of displacement is equal to a difference between said first and said second spacings.

8. A support plate according to claim 1, wherein each said hollow profile has two lateral walls 5 extending perpendicular to said acting surface 4 and transverse to said longitudinal direction and wherein a first said lateral wall 5 has recesses 6, for engaging said connecting elements 7,8, spaced at a first spacing from said acting surface 4 and a second said lateral wall has recesses 6, for engaging said connecting elements 7,8, spaced at a second spacing from said acting surface 4, said first spacing being greater than said second spacing.

9. A support plate according to claim 8, wherein said increment of displacement is equal to a difference between said first and said second spacings.

10. A support plate according to claim 8, wherein said recesses 6 are bores.

11. A support plate according to claim 1, wherein said acting surfaces 4 are slanted at an angle of 1° to 4°.

12. A support plate according to claim 11, wherein said angle is substantially 2°.

13. A support plate according to claim 1, wherein said acting surfaces are stepped such that in said upward direction a step of said stepped arrangement between two neighboring ones of said acting surfaces is downwardly oriented.

\* \* \* \* \*